(12) United States Patent
Parshin et al.

(10) Patent No.: US 9,523,138 B2
(45) Date of Patent: Dec. 20, 2016

(54) METHOD FOR DOUBLE DISLOCATION ALLOYING AND NANOPHASE MODIFICATION OF STEEL BY ATOMIC NITROGEN

(71) Applicant: OTKRYTOE AKTSIONERNOE OBSHHESTVO NOVOLIPETSKIJ METALLURGICHESKIJ KOMBINAT, Lipetsk (RU)

(72) Inventors: Vladimir Andreevich Parshin, Moscow (RU); Yury Leonidovich Gorokhov, Moscow (RU)

(73) Assignee: OTKRYTOE AKTSIONERNOE OBSHHESTVO NOVOLIPETSKIJ METALLURGICHESKIJ KOMBINAT, Lipetsk (RU)

( * ) Notice: Subject to any disclaimer, the term of this patent is extended or adjusted under 35 U.S.C. 154(b) by 0 days.

(21) Appl. No.: 15/169,904

(22) Filed: Jun. 1, 2016

(65) Prior Publication Data

US 2016/0273082 A1    Sep. 22, 2016

Related U.S. Application Data

(63) Continuation of application No. 14/848,750, filed on Sep. 9, 2015, now abandoned, which is a continuation of application No. PCT/RU2013/000190, filed on Mar. 13, 2013.

(51) Int. Cl.

| | |
|---|---|
| *C22C 38/04* | (2006.01) |
| *C22C 33/00* | (2006.01) |
| *C22C 38/42* | (2006.01) |
| *C22C 38/06* | (2006.01) |
| *C22C 38/02* | (2006.01) |
| *C22C 38/00* | (2006.01) |

(52) U.S. Cl.
CPC .......... *C22C 33/006* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01)

(58) Field of Classification Search
CPC ..... B82Y 30/00; C21C 7/0075; C22C 33/006; C22C 33/04; C22C 38/001; C22C 38/002; C22C 38/02; C22C 38/04; C22C 38/06; C22C 38/42
USPC ....................................................... 148/579
See application file for complete search history.

(56) References Cited

FOREIGN PATENT DOCUMENTS

| | | |
|---|---|---|
| JP | 11-279624 | 10/1999 |
| RU | 2467073 | 11/2012 |
| UA | 27931 | 11/2007 |

OTHER PUBLICATIONS

Search Report issued Nov. 28, 2013, in International Application No. PCT/RU2013/000190.
Written Opinion issued Nov. 28, 2013, in International Application No. PCT/RU2013/000190 (w/ English translation).
Averin et al, Nitrogen in metals, M. Metallurgy, p. 224, 1976 (w/English translation).
Gudremon E., Special steels, V. 1-2-M, Metallurgy, p. 1242, 1966 (w/English translation).
Encyclopedic Dictionary of Metallurgy, Chief Editor N. P. Liakishev, Moscow, 2000, p. 221 (w/English translation).

*Primary Examiner* — Jessee Roe
*Assistant Examiner* — Jenny Wu
(74) *Attorney, Agent, or Firm* — Oblon, McClelland, Maier & Neustadt, L.L.P.

(57) ABSTRACT

A new technology of intense double alloying and modification involves introduction, during the process of secondary treatment of steel, of nitrogen-containing substance in urea $(NH_2)_2CO$ into a ladle with a steel melt, which at a temperature of the steel liquid phase of approximately 1650° C. dissociates in an explosive manner, releasing atomic nitrogen. Conversion or transformation of an explosive dissociation of urea into an intensive process of self-propagating synthesis of nitride nanophases is carried out using differentiated by the amount and time schemes of the input of urea into steel melt, wherein the basic parameters, depending on the type of steel, are the flow rate of urea per tonne of steel in the range of 0.4-1.8 kg/tonne and speed of its input into the melt in the range of 5.0-8.0 kg per minute.

19 Claims, No Drawings

METHOD FOR DOUBLE DISLOCATION ALLOYING AND NANOPHASE MODIFICATION OF STEEL BY ATOMIC NITROGEN

CROSS-REFERENCE TO RELATED APPLICATIONS

This is a continuation of application Ser. No. 14/848,750, filed Sep. 9, 2015, which is a continuation of International application no. PCT/RU2013/000190, filed Mar. 3, 2013, the content of both are incorporated herein by reference in their entireties.

BACKGROUND

1. Field of the Disclosure

The present invention relates to ferrous metallurgy, namely, to the alloying and modification of steel with atomic nitrogen, which in contrast to molecular nitrogen, possesses unique physico-chemical properties, a very high chemical potential and highest energy potential, under influence of which the nature of the steel alloying and modification changes and causes fundamental physical qualities of steel.

2. Description of the Related Art

An object of the present invention relates to the ferrous metallurgy, namely, to secondary steel treatment, which is smelted in any steel melting unit and transformed into a casting ladle, where further technological operations related to deoxidation, alloying, modifying and refining steel are conducted. At present, almost all produced steel undergoes treatment with molecular nitrogen in the process of alloying by purging the liquid phase with molecular nitrogen, or by introducing into the melt nitrided ferroalloys. e.g., nitrided ferromanganese, ferrosilicon, ferrosilicon manganese, and/or ferrochrome, in combination with nitride-forming elements such as Al, Ni, V, and/or Ti. Positive results of the steel alloying with nitrogen have been achieved due to a high energy potential of molecular nitrogen, which is 10 times higher than the potential of the main alloying element of iron, i.e. carbon, thereby achieving increased durability, flexibility and impact elasticity of steel. See e.g., Gudremon E., Special steels (translated from German), V. 1-2-M, Metallurgy, p. 1242, 1966.

However, the technology of steel alloying with nitrogen containing ferroalloys and purging a liquid phase of steel with nitrogen gas has significant drawbacks which have been clearly revealed from the latest research conducted by academic science on an energy level of the potential of atomic nitrogen. It has been established that under the same temperature and pressure conditions, saturation of a steel melt with atomic nitrogen is 10 thousand times higher than the saturation of steel with molecular nitrogen. See, e.g., Averin V. V., Revyakin A. V., Nitrogen in metals, M. Metallurgy, p. 224, 1976.

Generation of atomic nitrogen through the dissociation of $N_2$ of nitrogen gas, or nitrogen of nitrogen containing ferroalloys requires high energy consumption, because its dissociation energy is 992 kJ/mol and almost equals to the energy of dissociation of inert argon, which is why even at the temperature of 3300° C. a level of dissociation of a nitrogen molecule does not exceed 0.1%. See, e.g., Lyakishev N. P. et al., Encyclopedic dictionary on metallurgy, V. 1, M., "Intenmet Engineering" p. 412, 2000.

SUMMARY

Accordingly, one object of the present invention is to provide a method for double alloying and nanophase modification of steel using atomic nitrogen, comprising introducing urea into a steel melt at a rate of from 5.0 to 8.0 kg per minute, wherein the urea dissociates to form atomic nitrogen in the steel melt; and forming a metal alloy from the steel melt, wherein the amount of urea introduced into the melt is from 0.4 to 1.8 kg of urea per tonne of the steel in the melt.

In another embodiment, steel in the steel melt comprises, by weight percent, from 0.14-0.22% of C; from 0.4-0.65% of Mn; and from 0.12-0.30% of Si.

In yet another embodiment, steel further comprises Si and a ratio of Mn to Si is from 1:1 to 2:1. In a different embodiment, steel comprises from 0.17 to 0.20% by weight of C. In another embodiment, steel comprises from 0.28 to 0.56% by weight of Mn. In another embodiment, steel comprises from 0.26 to 0.28% by weight of Si. In a different embodiment, steel comprises from 0.016 to 0.05 by weight of Al.

In one embodiment, steel in the steel melt may comprise, by weight percent, from 0.12 to 0.18% of C; from 1.2 to 0.6% of Mn; and from 0.17 to 0.37% of Si. In a another embodiment, steel in the steel melt comprises, by weight percent, ≤0.12% of C; from 1.3 to −1.7% of Mn; and from 0.5 to 0.8% of Si.

During the introduction of urea, a temperature of the steel melt may be about 1650° C.

In one embodiment, an amount of urea introduced into the melt is from 0.4 to 1.4 kg of urea per metric tonne of the steel in the melt. In another embodiment, an amount of urea introduced into the melt is from 0.4 to 0.8 kg of urea per tonne of the steel in the melt. In yet another embodiment, an amount of urea introduced into the melt is from 0.8 to 1.8 kg of urea per tonne of the steel in the melt.

In one embodiment, urea is introduced into the steel melt at a rate of 5.0 to 6.8 kg per minute. In a different embodiment, urea is introduced into the steel melt at a rate of 6.8 to 8.0 kg per minute.

The alloy in one embodiment has a yield point from 345 to 400 n/mm². In a different embodiment, the alloy has a yield point of from 1.5 to 2 times greater than an alloy in which the introducing of urea was not performed. In yet another embodiment, the alloy has an impact elasticity at −70° C. from 86 to 91 J/sm². In another embodiment, the alloy has an impact elasticity at −70° C. of from 2.5 to 3 times greater than an alloy in which the introducing of urea was not performed.

DETAILED DESCRIPTION OF THE EMBODIMENTS

All publications, patent applications, patents, and other references mentioned herein are incorporated by reference in their entirety. Further, the materials, methods, and examples are illustrative only and are not intended to be limiting, unless otherwise specified.

At the same time, considering that the content of nitrogen in nitrogen containing ferroalloys is 2-8%, quantity of nitrogen phases which can only be formed as a result of a chemical reaction of synthesis of atoms of alloying elements by atoms of nitrogen, is insignificant. Expenses for production of nitrogen containing ferroalloys are quite significant, because the foundation of their production technology is a relatively inert process of diffusion that requires high energy expenditures in the form of high temperatures and pressures. Therefore, the effectiveness of using nitrogen containing ferroalloys does not exceed significantly the expenses for their production. Presently, the appropriateness of a mass application of the technology of purging of a melted alloy with nitrogen gas raises even more questions. As during this process atomic nitrogen dissociates in an insignificant quantity, nitrogen that is not involved into nitride phases is transformed into a solid steel solution at the molecular state, which at the end leads to the degradation of metal. Thus, the use of steel purging with nitrogen gas could be only used selectively.

The inventors have developed a new process that is a technological breakthrough and provides significant improvement of physical qualities of steel and, in particular, provides improved durability of steel by 1.5-2 times and impact elasticity by 2-3 times, provides increase of qualities of steel products for consumers, provides decrease of the weight of metal structures by 20-25% and of mechanisms and machines by 15-20%, and provides increase of cold resistance of steel products up to −65° C. The new method also makes possible mass production of highly durable nanostructured steel with good weldability without softening of HAZ during welding, including thin sheets and armature. In the production of steel for mass consumption, the new method allows using less of alloying elements, including decrease of consumption of manganese in manganese containing substances by 60% and by 50% of nickel in nickel steel. A significant increase of quality and decrease of expenses of production of steel products could only be achieved by significantly changing current technological processes of steel production, including, firstly, making a change in the steel alloying, which is most costly, but also is the most important for changing the formation of improved physical properties and quality of steel. The inventors have resolved an objective of changing processes of alloying and modification of steel not through perfection of traditional schemes of alloying with the use of expensive materials, including application of even more expensive rare earth elements, but through the change of physico-chemical processes of alloying and modification of steel that change the very nature of alloying and modification. For these reasons, in the present application for new technologies of alloying and modification of steel, atomic nitrogen has been offered as the main alloying element, as it possesses unique physico-chemical properties such as a high energy potential and a very high chemical potential, in contrast to the known and widely used technologies of steel alloying with nitrogen containing ferroalloys and purging steel melt with nitrogen gas, in which nitrogen is in the molecular state in both cases. See e.g., Gudremon E., Special steels (translated from German), V. 1-2, M., Metallurgy, p. 1242, 1966.

The advantages of atomic nitrogen and its highest level of energy potential are confirmed by work of Russian Academy of Science, when in 1960 it was established that saturation of steel melt with atomic nitrogen under the same pressure and temperature exceeds this indicator of molecular nitrogen by 10 thousand times. See e.g., Averin V. V., Revyakin A. V., Nitrogen in metals, M., Metallurgy, p. 224, 1976. However, to perform a real, even an experimental process of steel alloying with atomic nitrogen at a temperature of the steel melt of approximately 1650° C. was impossible. A reason for this is that during the contact of nitrogen containing substances with steel melt a process of dissociation of these substances is accompanied by an excessive blustery, similar to an explosion, release of atomic nitrogen and accompanied gaseous components, which leads to release of steel melt into a ladle. An engineering solution for this problem, firstly, lies in using the most appropriate nitrogen containing substance of urea (carbamide) $(NH_2)_2CO$ with a high nitrogen content −46.6% and a temperature of dissociation of 174° C., which in the process of dissociation releases a large quantity of atomic nitrogen, 2.4 m³/kg, and of its others compounds. Secondly, an engineering solution lies in the creation and implementation of differentiated schemes for quantity and rate of urea input into steel melt, which transforms explosive process of the dissociation into a highly intensive process of a self-propagating synthesis of nitride nanophases. Base values of the differentiated schemes are limiting quantitative norms of the input of urea, 0.4-1.4 kg/metric tonne of steel, and speed of entry, 5.0-8.0 kg/metric tonne, depending on the melting temperature of alloy. Different input methods of urea into the steel melt could be used. Formed in the steel melt atomic nitrogen converts the process of steel alloying into a double process, two types of which occur in parallel. One type of alloying, a dislocation process, which follows from physical properties of atomic nitrogen—its high energy potential, under the influence of which nitrogen atoms are introduced into the interatomic space of crystals of iron, causing a change in the mutual arrangement of iron atoms, which leads to a distortion (disclinations) of the cube shape of the crystals of iron and is accompanied by a change in its size. The number and density of the modified planes of the mutual arrangement of atoms and density of their lines on the surface of crystals, which are called dislocations, characterized by Burger's vector, fundamentally change physical properties of steel. See e.g., Lyuakishev N. P. et al., Encyclopaedic dictionary on metallurgy V. l. M. "Intermet Engineering", p. 412, 2000.

The second type of the new steel alloying process follows from the chemical property of atomic nitrogen—its very high chemical potential, which at the temperature of steel melt of 1650° C., as a powerful catalyst, causes an intense chemical reaction of a self-expanding synthesis of nitrogen nanophases of alloying elements. Formed nitride nanophases of alloying elements accumulate on the surface of crystals, filling the entire intergranular space of the steel lattice. The second type of steel alloying process differs from traditional methods of alloying by the fact that alloying structures are formed no by alloying elements, but nitride phases of these elements. Simultaneously and in parallel with the changes in the process of alloying, a modified nanophase process of modification also takes place. The change lies in the fact that large quantities of formed very small nitride nanophases, which become quite resistant to impact and thermal influences, become numerous additional seeds of crystals of steel, fully compensating functions of modifying elements, such as titanium, cerium, boron and others.

A list of effects of the new technology of the steel alloying, given above, during production of experimental-industrial steel melts has significantly expanded. For example, it has been found that atomic nitrogen is actively involved into the process of formation of nitride nanophases elements of a natural alloyed raw material. High effectiveness of an alloying technology of steel involving atomic nitrogen has already been proven. However, the phenomenon of the improvement of physical properties of steel and quality of finished rolled steel for consumers at this early stage of development of the new technology is far from exhausted. Its research is at the beginning of this promising field and improvement of physical properties of steel could be achieved only due to steelmaking, without involving the technology of plastic deformation and heat treatment.

All ranges described in this application include all values and subvalues therebetween.

Having generally described this invention, a further understanding can be obtained by reference to certain specific examples which are provided herein for purposes of illustration only, and are not intended to be limiting unless otherwise specified.

EXAMPLE

Production of Steel for Construction Industry

A purpose of using the new technology of alloying and modifying steel for construction industry is to increase the strength, ductility and cold-resistance of steel in order to reduce a metal content (weight) of building structures by 20-25% and guaranteed operation under climatic conditions up to −65° C. In steel industry, in the production of steel for construction industry, there is a task of ensuring decrease of production costs (prime cost) by saving up to 50-60% of expensive alloying elements without compromising GOST standards related to the strength of steel.

Currently for production of building structures manufacturers widely use manganese steel, for example, of the 14G2 grade containing weight percentages of: 0.12-0.18 C; 1.2-1.6 Mn; 0.17-0.37 Si; as well as steel of the 09G2S grade containing weight percentages of: ≤0.12 C, 0.5-0.8 Si, 1.3-1.7 Mn. A disadvantage of said steel is a high content of Mn, increased production costs and low cold resistance. Widely used St3sp contains weight percentages of: 0.14-0.22 C; 0.4-0.65 Mn; 0.12-0.30 Si. A disadvantage of said steel in the production of building structures is a low level of mechanical properties—yield point, ductility, and impact elasticity, including at low temperatures. These shortcomings are due to the technology of alloying used during their production, including use of nitrided ferroalloys and purging steel melt with nitrogen gas. A proposed by the inventors technology of production of steel for construction industry of the St3sp grade using technology of intense double alloying and nanophase modification includes three melts, two of them are experimental and the third one is comparative. A metal was smelted in a 150-metric tonne converter and let go into a casting ladle, where it deoxidazed and alloyed to achieve the following results in experimental melts. During the first smelting without changing a chemical composition and ratio of Mn and Si (2:1), the strength of 3sp steel was increased from 245 N/mm² to 325-360 N/mm² and impact elasticity was increased by 2.5-3 times. In the second smelting the content of Mn was reduced by 2 times up to the ratio of Mn and Si of 1:1, without compromising the GOST standard related to the strength of steel with an increase in impact elasticity. The third experiment produced a comparative melt which was alloyed without changing the alloying scheme.

A chemical composition of the experimental (tested) and comparative alloys is shown in Table 1.

(120 kg per bucket), and simultaneously an aluminum rod was inserted on the basis of 1.2 kg/metric tonne steel. The intensity of the introduction of urea was 6.8 kg per minute and the rate of input of 14 mm wire, filled with urea in the amount of 105 grams per meter, was 66 meters per minute. Other process parameters are provided in Table 2.

TABLE 2

| St3sp | | 1$^{st}$ melt | 2$^{nd}$ meld | Comparative |
|---|---|---|---|---|
| Temperature on the wire and during release from the convector, ° C. | | 1698/1685 | 1702/1693 | 1688/1681 |
| Consumption of materials during the release | Cox, kg | 345 | 340 | 345 |
| | Ferrosilicon FS65, kg | 300 | 300 | 300 |
| | Silicomanganese MnS17, kg | 1000 | 500 | 1000 |
| | Aluminium, Pyramid AB 87, kg | 100 | 100 | 100 |
| Initial temperature of MFI, ° C. | | 1623 | 1640 | 1645 |
| Consumption of materials for MFI | Al rod, m | 202 | 234 | — |
| | Urea wire, m | 1202 | 1200 | 0 |
| Duration of purging with argon, min | | 10 | 10 | 12 |
| Final temperature of the metal on the MFI, ° C. | | 1567 | 1577 | 1580 |

TABLE 3

Results of the mechanical testing of steel St3sp

| | Mechanical properties | | |
|---|---|---|---|
| Number of melt | Yield point n/mm² | Impact elasticity - 70° C., J/sm² | Relative elongation, 85% |
| 1 | 400 | 91 | 30 |
| 2 | 345 | 86 | 33 |
| Comparative | ≥245 | ≥26 | ≥26 |

The study of the metal of the tested melts confirmed significant increase in the strength grade of steel from 245 N/mm² to 345-400 N/mm², i.e. it could be said that the 3sp alloy type was transformed into a low alloy of the 14G2 or 09G2S type. At the same time impact elasticity significantly increased at −70° C. by 2.5-3 times. It is known that impact elasticity and, consequently, cold-resistance of steel is a feature of the size of a granule and of the frequency of the intergranular space. The confirmation of the fineness and frequency of its intergranular space, which is filled with

TABLE 1

| Number of alloy | Content of elements in the sample, %% | | | | | | | | | |
|---|---|---|---|---|---|---|---|---|---|---|
| | C | Mn | Si | S | Al | N | P | Cr | Ni | Cu |
| 1 | 0.17 | 0.56 | 0.28 | 0.04 | 0.05 | 0.015 | 0.013 | 0.005 | 0.05 | 0.05 |
| 2 | 0.20 | 0.28 | 0.26 | 0.04 | 0.016 | 0.08 | 0.013 | 0.006 | 0.03 | 0.05 |
| 3 comparative | 0.18 | 0.54 | 0.22 | 0.04 | 0.05 | 0.005 | 0.014 | 0.004 | 0.05 | 0.05 |

The technology of alloying of the experimental steel melts lies in the fact that urea was introduced on the metal finishing installation (MFI) into the steel melt as a filler of aflux cored wire on the basis of 0.8 kg/metric tonne of steel nitride nanophases and, which is proved to be quite resistant to power and thermal influences, was a result of the studies of weldability of steel produced using the new technology of alloying. Central Scientific-Research Institute of Steel Constructions (CSRISC) conducted experiments. The study was conducted on the structure and properties of welded joints of a thin sheet with a thickness of 5 mm, as it becomes really soft during welding as compared to a rolling of a large thickness. It was found that a microstructure in the heat affected zone (HAZ) of welded joints was a ferrite-pearlite mixture of varying fineness, and the size of a ferrite granule was merely one or two points larger than the size of a granule of the parent metal.

The significance of the new technology of alloying of steel using atomic nitrogen lies not only in the fact that it is modern and acceptable for production of at least 90% of metal products, but primarily in the fact that our knowledge has penetrated deeper into the atomic world of metallurgical processes. "There is lot of space down there." This postulate of experts of nanotechnology opens great perspectives in atomic and intensive processes in the metallurgy industry of the 21st century.

Thus, the foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modification and variations on the present invention are possible in light of the above teachings. It is therefore to be understood that within the scope of the appended claims, the invention may be practiced otherwise than as specifically described herein.

The invention claimed is:

1. A method of double dislocation alloying and nanophase modification of steel using atomic nitrogen, comprising:
   introducing urea into a steel melt at a rate of from 5.0 to 8.0 kg per minute, wherein the urea dissociates to form atomic nitrogen in the steel melt; and
   forming a metal alloy from the steel melt,
   wherein an amount of urea introduced into the melt is from 0.4 to 1.8 kg of urea per tonne of the steel in the melt.

2. The method of claim 1, wherein the steel in the steel melt comprises, by weight percent: from 0.14 to 0.22% of C; from 0.28 to 0.56% of Mn; and 0.05% of Cu.

3. The method of claim 2, wherein the steel further comprises Si and a ratio of Mn to Si is from 1:1 to 2:1.

4. The method of claim 2, wherein the steel comprises from 0.17 to 0.20% by weight of C.

5. The method of claim 2, wherein the steel comprises from 0.28 to 0.56% by weight of Mn.

6. The method of claim 3, wherein the steel comprises from 0.22 to 0.28% by weight of Si.

7. The method of claim 3, wherein the steel further comprises from 0.016 to 0.05 by weight of Al.

8. The method of claim 1, wherein the steel in the steel melt comprises, by weight percent:
   from 0.12 to 0.18% of C;
   from 0.28 to 0.56% of Mn; and
   from 0.22 to 0.28% of Si.

9. The method of claim 1, wherein the steel in the steel melt comprises, by weight percent:
   ≤0.12% of C;
   from 0.28 to 0.56% of Mn; and 0.05% of Cu.

10. The method of claim 1, wherein, during the introducing, a temperature of the steel melt is about 1650° C.

11. The method of claim 1, wherein the amount of urea introduced into the melt is from 0.4 to 1.4 kg of urea per tonne of the steel in the melt.

12. The method of claim 1, wherein the amount of urea introduced into the melt is from 0.8 to 1.8 kg of urea per tonne of the steel in the melt.

13. The method of claim 1, wherein the urea is introduced into the steel melt at a rate of 5.0 to 6.8 kg per minute.

14. The method of claim 1, wherein the urea is introduced into the steel melt at a rate of 6.8 to 8.0 kg per minute.

15. The method of claim 1, wherein the alloy has a yield point from 345 to 400 N/mm$^2$.

16. The method of claim 1, wherein the alloy has a yield point of from 1.5 to 2 times greater than an alloy in which the introducing of urea was not performed.

17. The method of claim 1, wherein the alloy has an impact elasticity at −70° C. from 86 to 91 J/sm$^2$.

18. The method of claim 1, wherein the alloy has an impact elasticity at −70° C. of from 2.5 to 3 times greater than an alloy in which the introducing of urea was not performed.

19. The method of claim 1, wherein the metal alloy provides decreased weight of metal structures by 20-25% and mechanisms and machines by 15-20% compared to when a metal alloy is produced by a different method.

* * * * *